United States Patent [19]

Barfell

[11] Patent Number: 4,518,139
[45] Date of Patent: May 21, 1985

[54] SEAT PEDESTAL
[75] Inventor: Don L. Barfell, Elkhart, Ind.
[73] Assignee: Elkhart Machine & Tool Co., Inc., Elkhart, Ind.
[21] Appl. No.: 531,018
[22] Filed: Sep. 12, 1983
[51] Int. Cl.³ .............................................. A47C 1/00
[52] U.S. Cl. .................................. 248/418; 108/142; 297/349
[58] Field of Search ............... 248/418, 415, 416, 417, 248/432, 544, 425; 108/142, 94; 297/349; 312/11, 125; 182/65, 66

[56] References Cited

U.S. PATENT DOCUMENTS

| | | | |
|---|---|---|---|
| 641,634 | 1/1900 | Bennett | 248/425 |
| 2,845,990 | 8/1958 | Hubert | 248/425 |
| 3,708,203 | 1/1973 | Barecki | 248/416 |
| 3,858,834 | 1/1975 | Gimen | 248/418 |
| 3,868,084 | 2/1975 | Quakenbush | 248/418 |
| 3,926,396 | 12/1975 | Hall | 248/418 |
| 3,975,050 | 8/1976 | McKee | 297/328 |

Primary Examiner—Reinaldo P. Machado
Assistant Examiner—Alvin Chin-Shue
Attorney, Agent, or Firm—James D. Hall

[57] ABSTRACT

An improved pedestal for a rotatable seat which includes a shiftable pivot arm and associated latch part. The arm and latch cooperate with a flange of the pedestal support member to secure the plate against detachable lifting during normal seat rotation.

3 Claims, 5 Drawing Figures

4,518,139

SEAT PEDESTAL

SUMMARY OF THE INVENTION

This invention relates to an improved pedestal for a rotatable seat and will have special application to a pedestal for a vehicle seat.

Previously, pedestals for swivel-type vehicle seats were usually equipped with a pivot arm which releasably engaged the pedestal support member, allowing the seat to be rotated upon release of the arm. When the pivot arm was released, the plate member which carries the seat could be removed from the support member if the arm was not relatched, allowing the seat to be removed. Such constructions are disclosed in U.S. Pat. Nos. 2,334,193; 3,858,834; 3,926,396; and 3,975,050. A disadvantage of such constructions is that the plate member and thus the seat may be inadvertently detached from the pedestal support member while the seat is being rotated.

This invention calls for a support member which includes a radially extending flange at its upper end. A seat carrying plate is rotatably supported at the support member upper end. A lock arm, having a latch part which extends into a notch in the support member flange and a lip part which rides beneath the support member flange, is pivotally connected to the seat carrying plate and prevents the plate from being inadvertently detached from the support member while allowing rotation of the plate upon the support member. To detach the plate from the support member, the arm is pivoted fully outwardly until the arm lip part clears the support member flange.

Accordingly, it is an object of this invention to provide for an improved pedestal for a rotatable vehicle seat.

Another object of this invention is to provide a pedestal which is for a vehicle seat and which is safer to operate than previous pedestals.

Another object is to provide a pedestal which is for a vehicle seat which is fully adjustable and is efficient, and economical to produce.

Still other objects will become apparent upon a reading of the following specification.

BRIEF DESCRIPTION OF THE DRAWINGS

A preferred embodiment has been chosen to disclose the principles of the invention wherein.

DESCRIPTION OF THE PREFERRED EMBODIMENT

Figure 1:
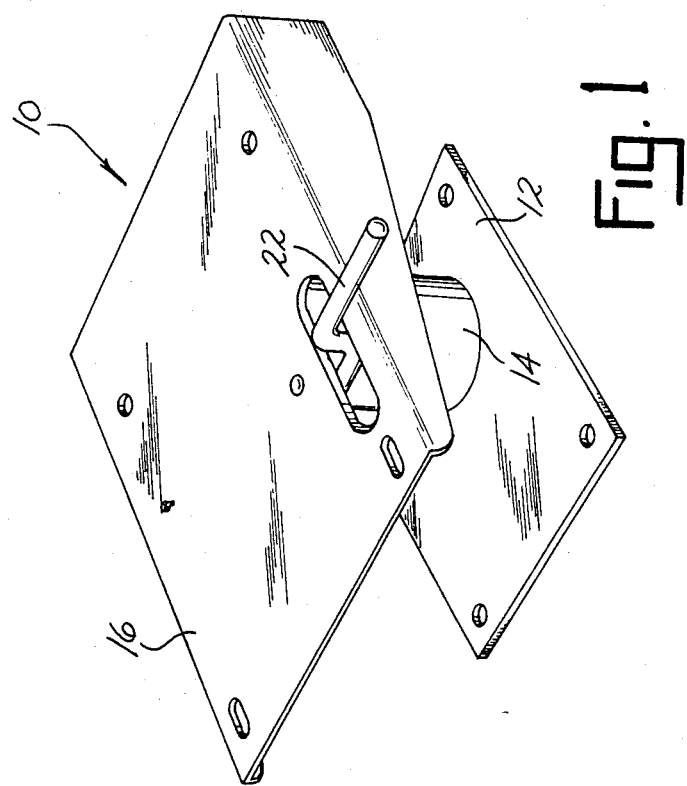
FIG. 1 is a top perspective view of the seat pedestal.

The preferred embodiment herein described is not intended to be exhaustive or to limit the invention to the precise form disclosed. It is chosen and described to best explain the principles of the invention and its application and practical use to thereby enable others skilled in the art to utilize the invention.

The pedestal 10 of this invention includes a base 12, an upright support member 14 and an upper plate 16. Pedestal 10 is adapted to carry a connected vehicle seat, not shown, atop plate 16. A tubular support member 14 is preferably attached to base 12 by welding. A pivot tube 18 extends from the lower face 15 of plate 16 and into center opening 20 of the of support member 14, with the plate and its pivot tube being rotatable relative to base 12 and the support member. To facilitate rotational movement of plate 16 relative to base 12, a bearing member 36 is located between plate 16 and support member 14.

Figure 2:
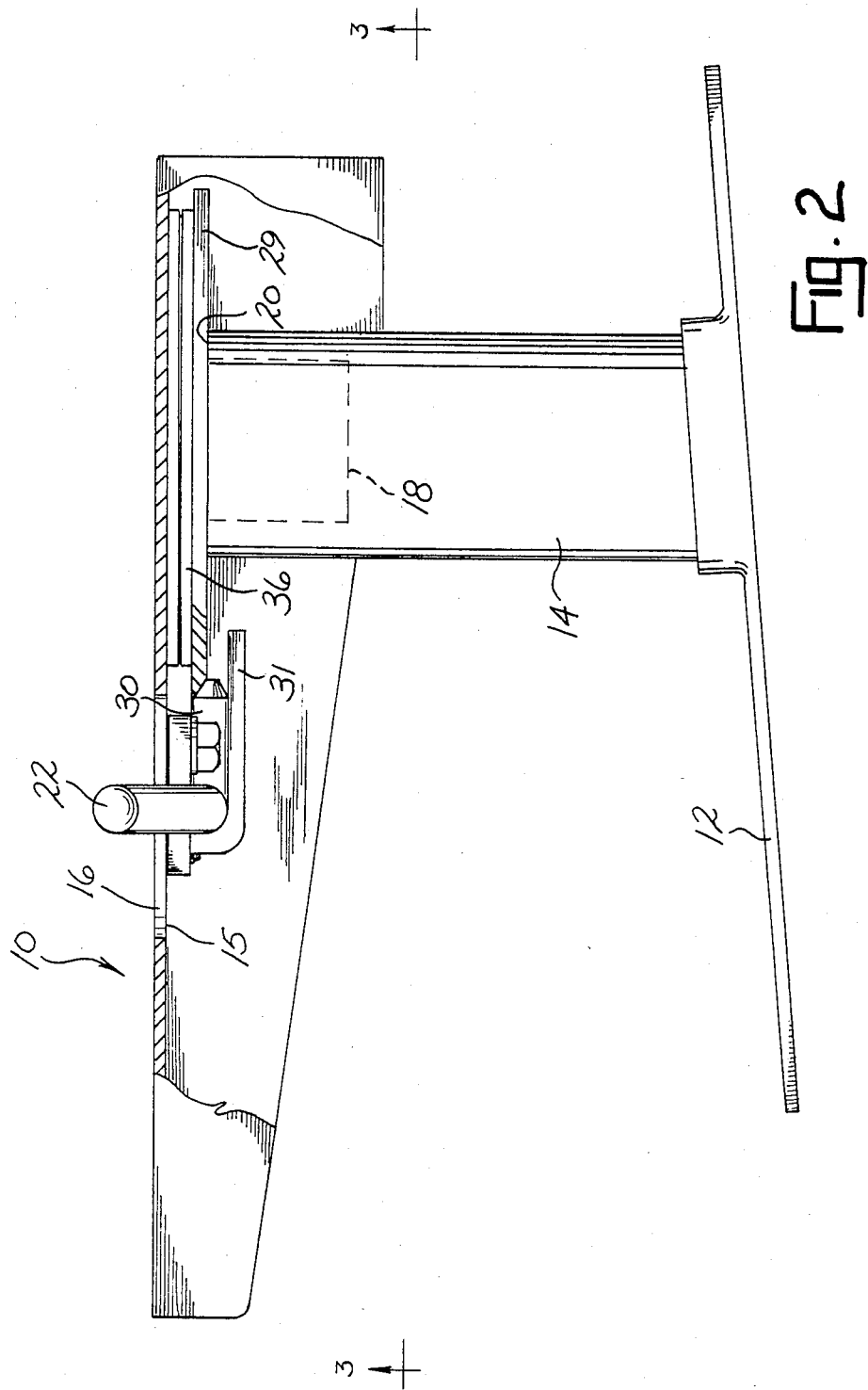
FIG. 2 is a side elevational view of the pedestal arm in a locked position with portions shown broken away for purposes of illustration.
Figure 3:
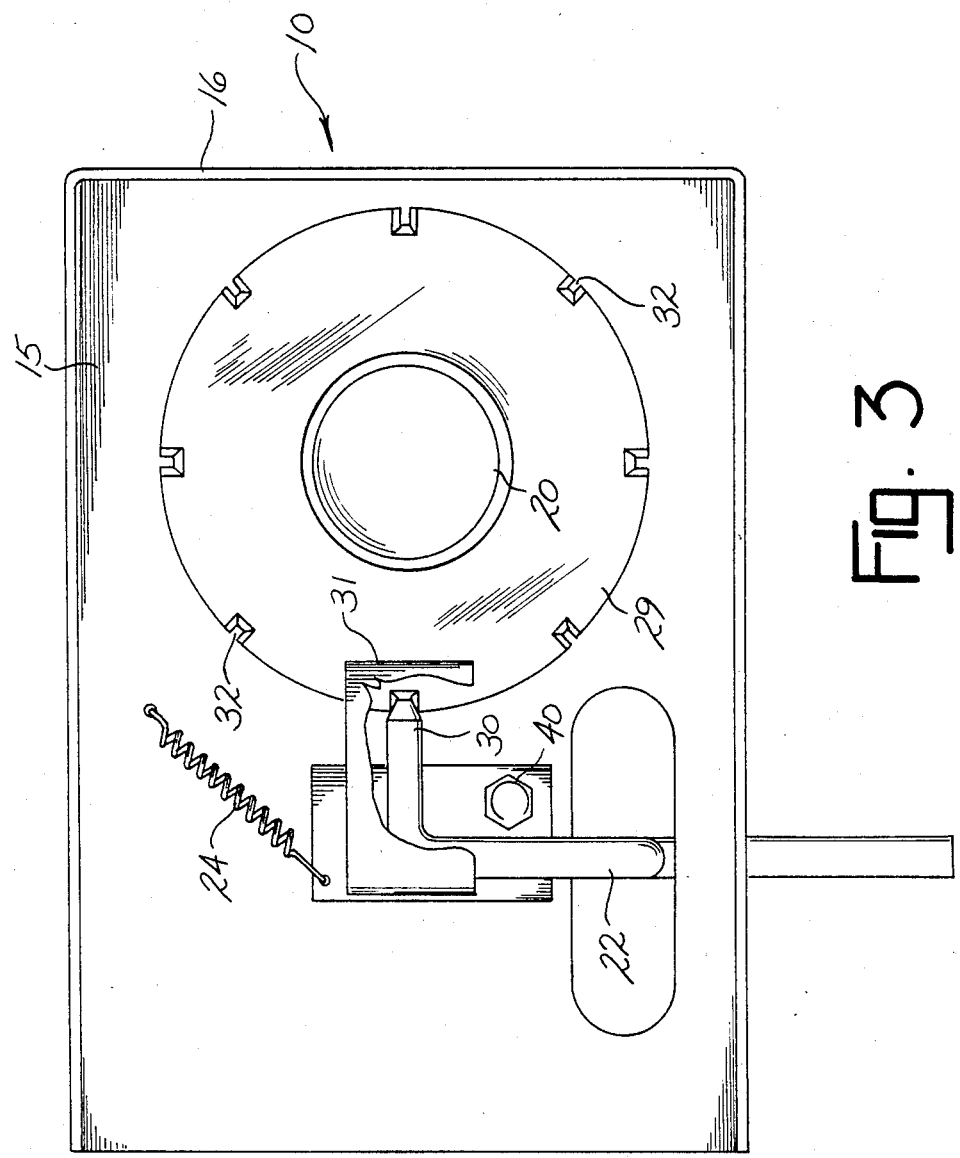
FIG. 3 is a sectional view taken along line 3—3 of FIG. 2.

Plate 16 carries a pivoted lock arm 22 secured by bolt 40 to plate lower face 15. Arm 22 includes a latch part 30 and an underlying lip part 31 which projects beyond the latch part. A helical spring 24 is attached at one end to plate 16 and at its other end to arm 22. Support member 14 includes an upper outwardly extending flange 29. There are a plurality of circumferentially spaced notches 32 formed within the periphery of support member flange 29. Spring 24 serves to urge arm latch part 30 into a notch 32 of support member flange 29 to secure plate 16 against rotation relative to support member 14, as seen in FIG. 3. With plate 16 in such a locked position, arm lip part 31 underlies support member flange 29 as seen in FIG. 2.

Figure 4:
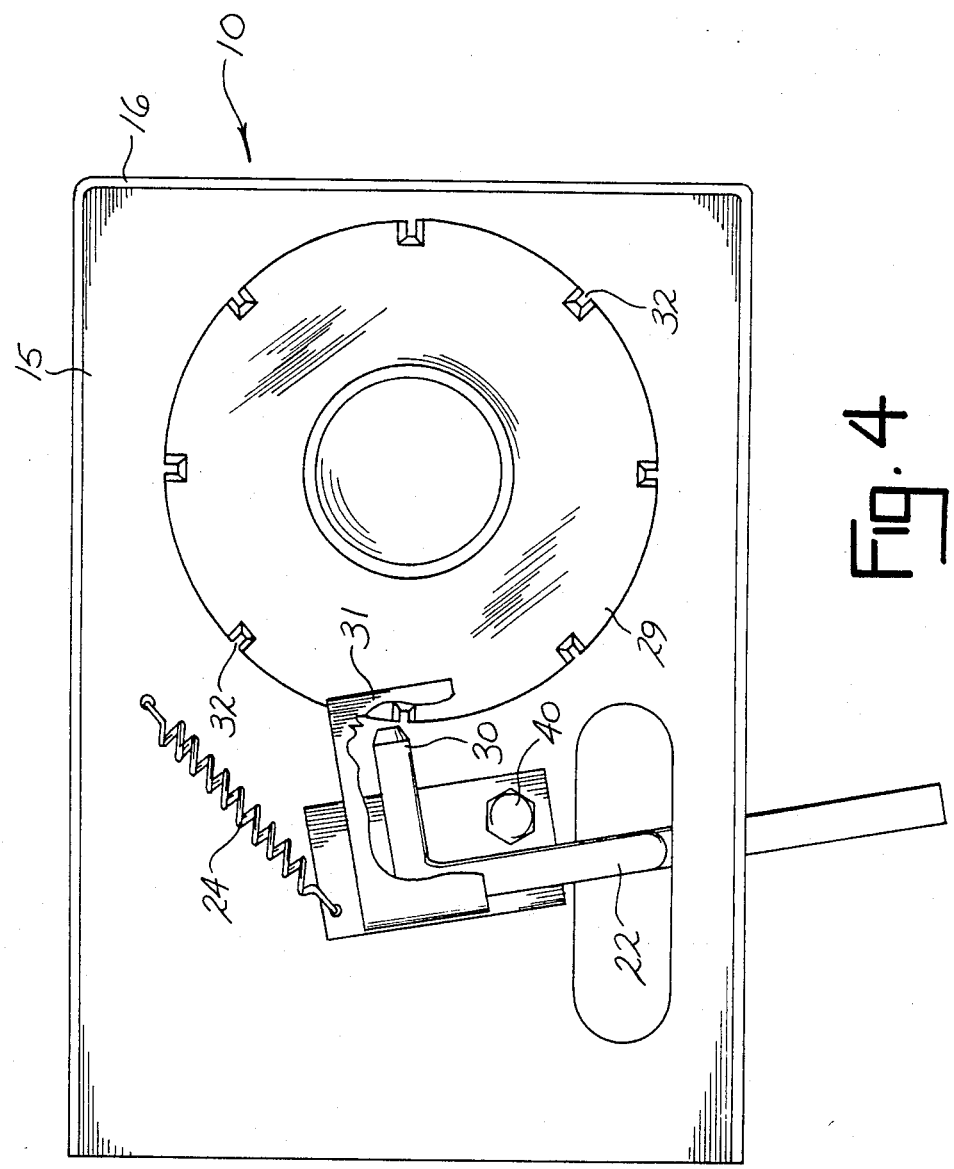
FIG. 4 is a view similar to FIG. 3, but showing the pedestal arm in a partially released position.
Figure 5:
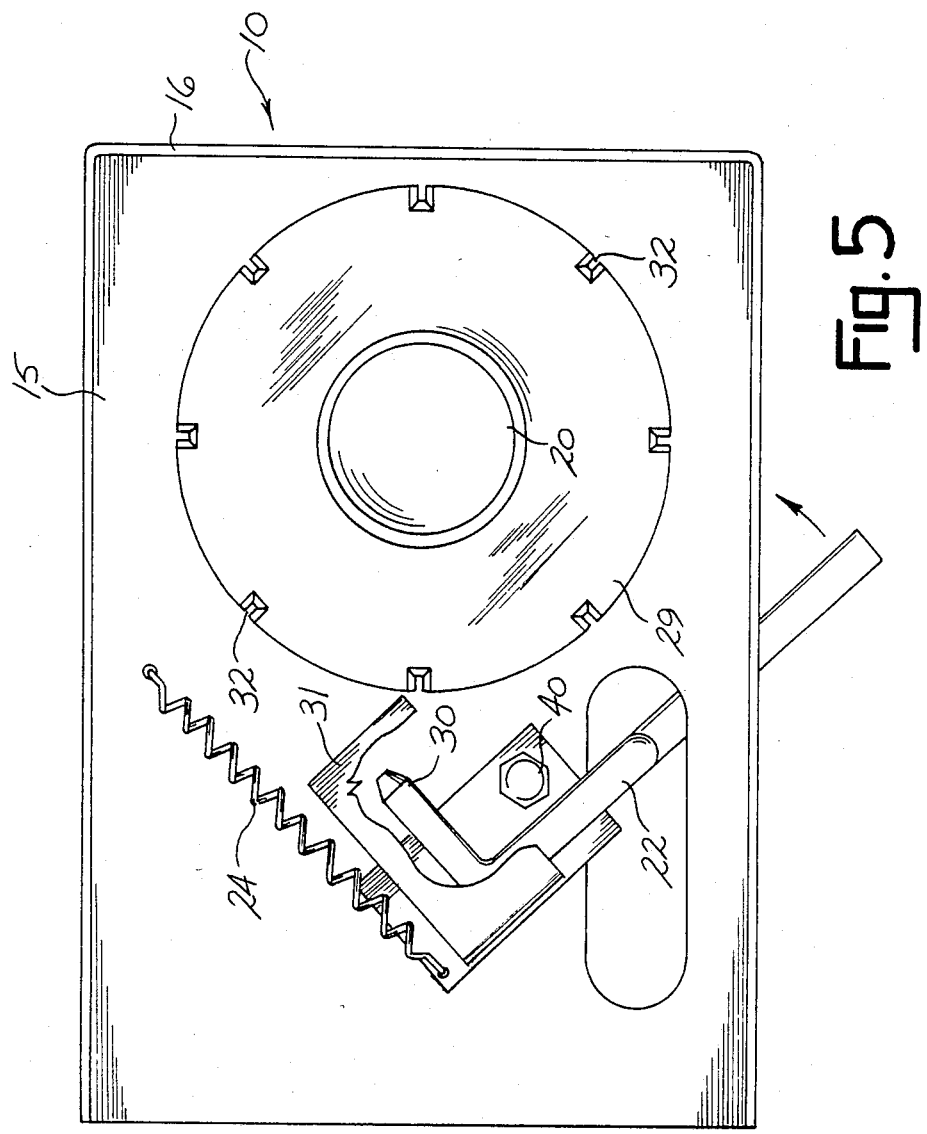
FIG. 5 is a view similar to FIG. 3, but showing the pedestal arm in a fully released position.

When it is desired to rotate plate 16, such as when changing seat location, arm 22 is pivoted to withdraw arm latch part 30 from its receiving notch 32 into a partial release position, as shown in FIG. 4. In this partial release position, arm latch part 30 rides against support member flange 29 and arm lip part 31 underlies flange 29 to secure plate 16 against unrestricted upward movement relative to support member 14. When it is desired to detach plate 16 from support member 14, arm 22 is pivoted into its full release position to withdrawn arm lip part 31 from beneath support member flange 29 as seen in FIG. 5. Plate 16 can then lifted to withdraw pivot tube 18 from support member 14. Constructed in this fashion, support member flange 29 and arm 22 cooperate to allow rotation of plate 16 relative to base 12, while preventing inadvertent removal of the plate and its associated seat.

It is to be understood that the invention is not to be limited to the above description but may be modified within the scope of the appended claims.

I claim:

1. In a pedestal for a rotatable seat including a base, a support member extending upwardly from said base, a plate member adapted to carry said seat supported by said support member, said plate member being rotatable relative to said support member and being detachable from the support member upon lifting movement, releasable lock means for preventing rotational movement of said plate member relative to said support member, the improvement wherein said support member includes a radially extending annular flange, said lock means being shiftably connected to said plate member and including a latch part shiftable in a substantially horizontal plane between a lock position in engagement with said support member flange preventing said plate member rotational movement and a full release position detached from the support member flange, said lock means including a lip positioned under said support member flange when said latch part is in its said lock position to prevent said detachable lifting movement of the plate member from the support member, said lock means lip being positioned out from under said support member when said latch part is in its full release position to allow said detachable lifting movement of the plate member from the support member, said latch part having a partial release position between its lock and full release positions wherein the latch part is disengaged from said support member to allow rotation of said plate member relative to said support member with said lip positioned under said support member flange.

2. The Pedestal of claim 1 wherein said support member flange includes a peripheral edge having a plurality of circumferentially spaced notches, said latch part positioned within a selected one of said notches when the latch part is in its said lock position.

3. The pedestal of claim 2 and biasing means associated with said lock means and said plate member for normally urging said latch part into its said lock position with the latch part extending into a selected one of said notches.

* * * * *